Figure 1:
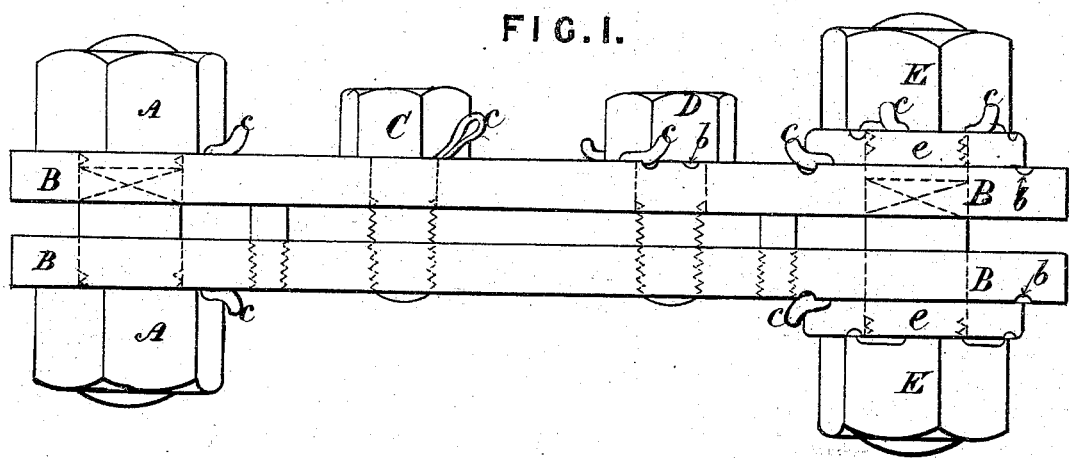

H. CARLILE.
NUT-LOCK.

No. 173,765. Patented Feb. 22, 1876.

WITNESSES:
J. Stitt
Wm A Skinkle

INVENTOR:
Hugh Carlile
by his Attorney
Wm D. Baldwin

UNITED STATES PATENT OFFICE.

HUGH CARLILE, OF LONDON, ENGLAND.

IMPROVEMENT IN NUT-LOCKS.

Specification forming part of Letters Patent No. 173,765, dated February 22, 1876; application filed January 18, 1876.

*To all whom it may concern:*

Be it known that I, HUGH CARLILE, of No. 15, Angel Court, Throgmorton street, in the city of London, England, have invented certain Improvements in Locking Screw-Bolts, Nuts, and Washers, of which the following is a specification:

My improvement relates to that class of screw-bolts, nuts, and washers in which locking-pins are inserted in grooves therein; and the object of this invention is to supply a cheap, ready, and effectual means of preventing screw-bolts and nuts from working loose when they have once been screwed home. To prevent screw-nuts from working loose, I furnish the inner face of the nut with grooves passing across it between the outer sides of the nut and the central hole. In the surface against which the nut is to be screwed I also form grooves or indentations, which, as the nut is turned, will coincide in succession with the grooves across the nut. When a nut has been screwed home and one of the grooves in its face has been brought to coincide with one of the grooves or indentations at an angle of thirty degrees to one another in the surface against which it is being screwed, a pin of metal or other material is inserted into the channel formed by the coinciding grooves, so as to pass from end to end of it and fit it closely. Screw-bolts and washers may be secured in the same manner. The subject-matter claimed will hereinafter specifically be designated.

In the drawing annexed, examples are shown of screw-bolts, nuts, and washers secured in the manner above described.

Figure 2:
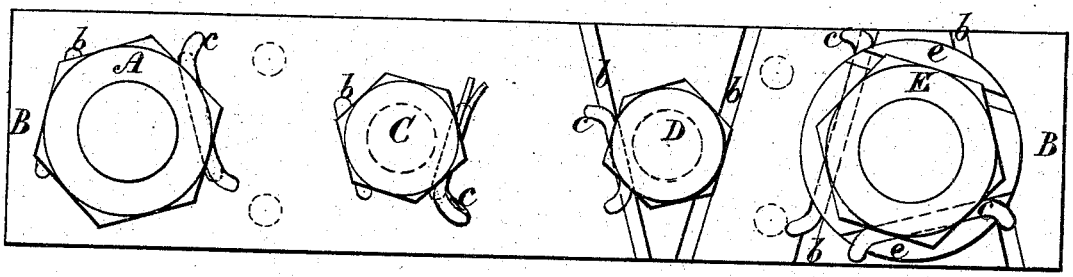
Figure 3:
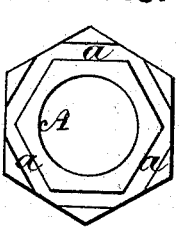

Figure 1 shows an edge view of two metal plates, B B, held together by nuts and bolts. Fig. 2 is a face view of the same. The nuts A, on the left-hand side of Figs. 1 and 2, are hexagon-nuts, with six grooves, *a a*, across their inner faces, as shown at Fig. 3. These grooves are all equally distant from the center of the hole, and they pass from one side of the nut to the side adjacent to it.

The two indentations *b b* in the face of the plates B are at an angle of thirty degrees to one another, so that one-twelfth only of the complete turn of the nut is required to bring one of the grooves in the nut to coincide with one of the indentations in the plate. The indentations *b* extend slightly beyond the nut, and gradually curve upward at their ends, to allow of the ready insertion of a pin into them. This pin *c* may simply be a length of wire, say of steel, iron, brass, copper, or other metal or material, and when it has been inserted into the channel formed by the coinciding of one of the grooves and one of the indentations, its ends may be bent up to keep it in place; or the pin may have a head formed at one end of it, or it may be a split pin.

Figure 4:
Figure 4:
Figure 4:
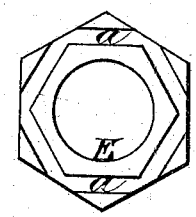

At C is shown a screw-bolt with a hexagonal head, having, like the nuts A, grooves *a* upon its inner face, as shown at Fig. 4. Similar indentations, *b b*, are also formed in the plate B. A similar screw-bolt is also shown at D; in this case the indentations or grooves *b b* are carried right across the plates B, instead of terminating a short distance away from the exterior of the head of the bolt, as with the indentations shown to be used in connection with the bolt-head C. At E are shown hexagonal nuts, with washers *e*. In this case the nuts are locked to the washers, and the washers to the plates, in the manner above described.

When it is required to unscrew a nut or screw-bolt which has been locked in the manner hereinbefore described, the locking-pin must first be taken out; or, if the pin be of soft metal or material, the nut or bolt may be forced round, so as to cause it to shear the pin, or so squeeze it as to allow the nut to turn. The channel formed by the coinciding of a groove in a nut or bolt and a groove in the surface against which it is screwed may be of a round, or square, or other suitable cross-section. The groove or grooves in the surface against which the nut is to be screwed may also, in some cases, have a different width from the groove or grooves in the face of the nut, so as to form a sufficiently large channel for the insertion of the pin after the nut or bolt has been screwed home, even if the bolt have some side play in the bolt-hole.

In the drawings the heads of the screw-bolts and the nuts are shown to be hexagonal; but they might be square or circular, or of other suitable shape. The number of grooves formed upon the inner face of the nut or bolt-head may also be varied. I form them with as many grooves as there are sides to the nut or bolt-head, and in all cases the grooves pass across the face of the nut, bolt head, or washer clear of the central hole or stem.

The grooves $b\ b$, being formed at the inclination to each other shown, admit of a very close adjustment, it being only necessary, to bring the nut from one locking position to another, to give it a partial turn, bearing such a proportion or part to a full revolution as is represented by a number formed by doubling the grooves of the nut, which grooves, as stated, correspond in number with the sides of the nut.

What I claim is—

1. The combination of the bolt-head or nut, having grooves $a$ crossing its inner face between adjacent sides, and corresponding in number with the sides, and a bearing therefor, having grooves $b$, arranged at an angle of thirty degrees to each other, as set forth, whereby a very slight partial turn of the nut or bolt-head causes one of the grooves therein to coincide with one or the other of the grooves in the bearing, to admit of the insertion of a locking-pin.

2. Bearing-plates or washers having two grooves, $b\ b$, at an angle of thirty degrees to one another, as set forth, for the purpose specified.

3. The combination, substantially as hereinbefore set forth, of the plate through which the bolt passes, having grooves at an angle of thirty degrees to one other, the washer grooved on its under face, and having, at an angle of thirty degrees to one another, grooves on its upper face, the bolt-head or nut having grooves on its inner face, and the locking-pins, whereby both the washer and the nut or bolt-head may be adjusted by slight partial turning to receive the pins which hold the washer in a fixed position upon the plate, and the nut or bolt-head in a fixed position upon the washer.

4. A washer constructed, as hereinbefore set forth, with grooves arranged at an angle of thirty degrees to one another, upon both its outer and inner faces, for the purposes specified.

H. CARLILE.

Witnesses:
  G. F. WARREN,
  WILMER M. HARRIS,
*Both of No. 97 Gracechurch street, London.*